(No Model.)  3 Sheets—Sheet 1.

W. A. WOOD.
RAKE AND REEL FOR HARVESTERS.

No. 265,729. Patented Oct. 10, 1882.

Witnesses:
Franck L. Ourand
R. M. Smith

Inventor:
Wm Anson Wood,
by A. M. Smith
attorney (No Model.) 3 Sheets—Sheet 3.

W. A. WOOD.
RAKE AND REEL FOR HARVESTERS.

No. 265,729. Patented Oct. 10, 1882.

Witnesses:
Franc L. Durand
R. M. Smith

Inventor:
Wm Anson Wood.
by A. M. Smith,
Attorney.

UNITED STATES PATENT OFFICE.

WILLIAM ANSON WOOD, OF YOUNGSTOWN, OHIO, ASSIGNOR TO FRANK WOOD, OF SAME PLACE.

RAKE AND REEL FOR HARVESTERS.

SPECIFICATION forming part of Letters Patent No. 265,729, dated October 10, 1882.

Application filed June 15, 1882. (No model.)

*To all whom it may concern:*

Be it known that I, WM. ANSON WOOD, of Youngstown, county of Mahoning, and State of Ohio, have invented new and useful Improvements in Combined Rake and Reel for Harvesters, of which the following is a full, clear, and exact description, reference being had to the accompanying drawings, making part of this specification.

My invention relates to a novel arrangement of tripping-gears in connection with the cam switch or gate for changing the path of the rake-arms and the latch for locking said cam-switch in position to act as reel-arms, whereby every second, third, or fourth arm may be made to operate automatically as a rake-arm for removing the grain from the platform; also, to a novel arrangement of adjustable tripping-lever in combination with said tripping-gears and the latch for locking the cam-switch in position to cause the rake-arms to act as reel-arms only, whereby said tripping-lever is placed under the control of the attendant, and may be thrown out of action under any adjustment of the tripping-gears, and to a novel arrangement for effecting the adjustment of the tripping-gears, as hereinafter explained.

Figure 1:
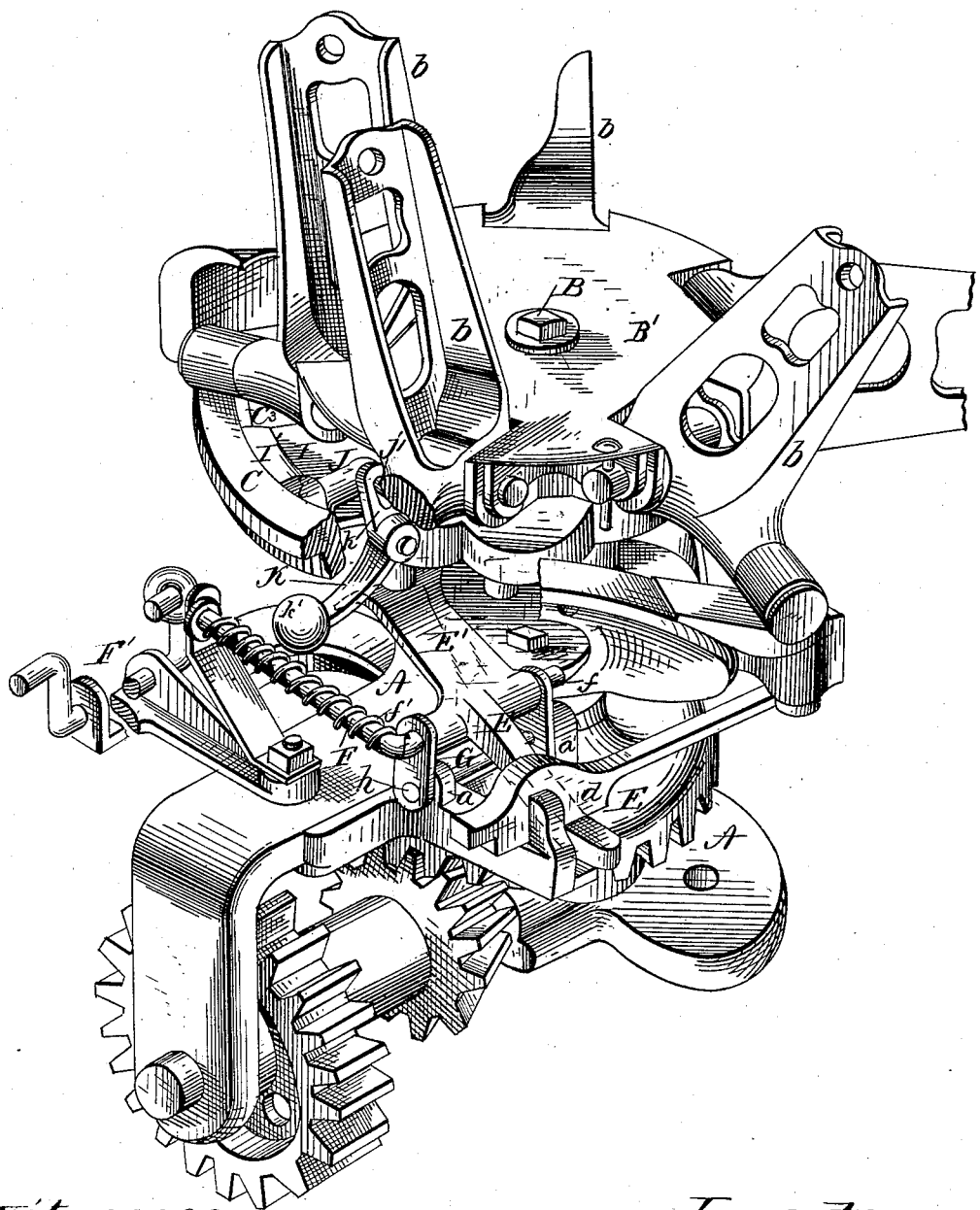
Figure 2:
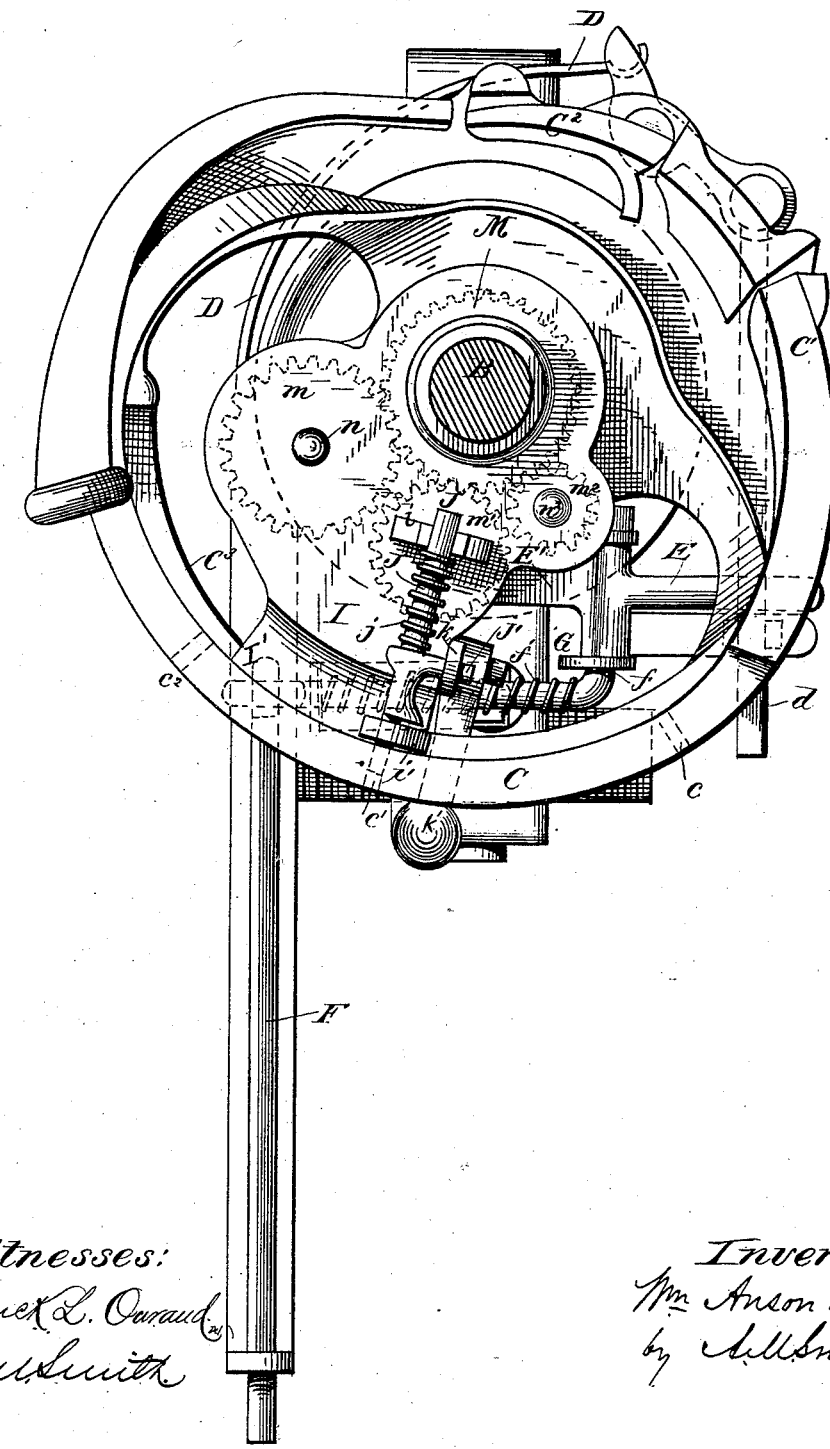
Figure 3:
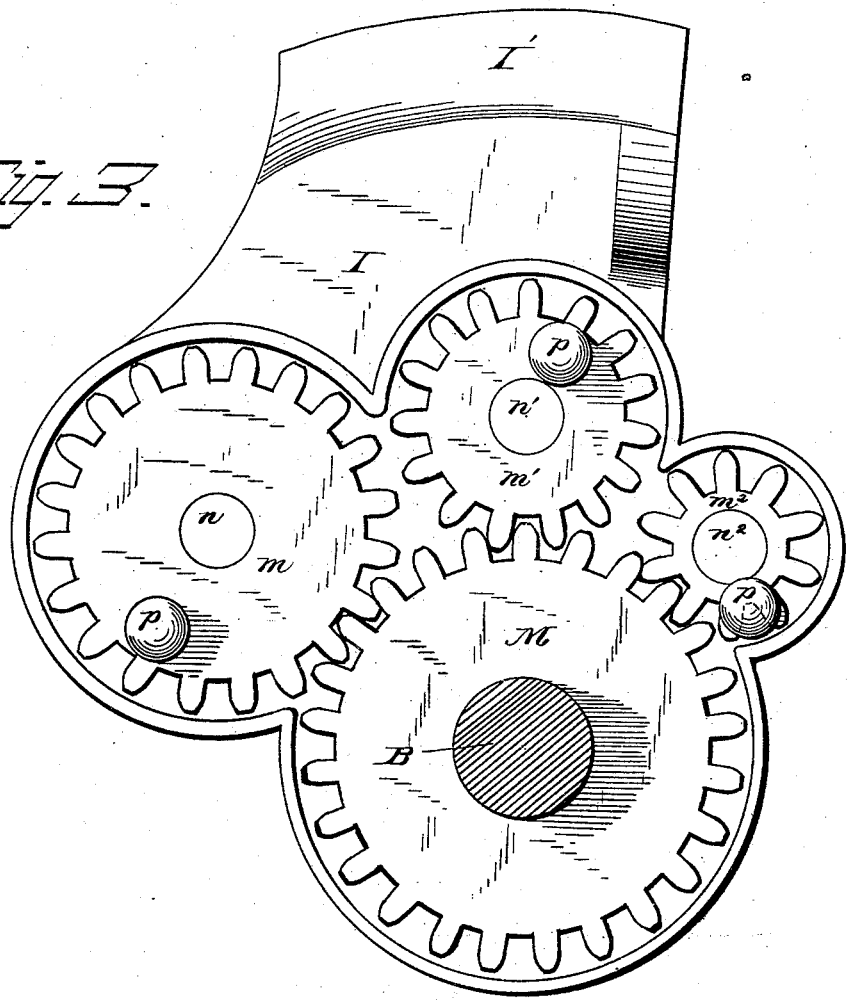

In the accompanying drawings, Figure 1 is a perspective view of the rake-head, cam, and gearing, with the cam partly broken away to show the arrangement of the other parts. Fig. 2 represents a horizontal section through the same, taken just underneath the revolving rake-head, and giving a plan or top view of the other parts, and Fig. 3 is a bottom view of the adjustable tripping-gear plate with the tripping-gears in place.

The rake-stand, cam and cam-switch or gate, the spring for retracting and the weighted latch for locking said switch, are similar in construction and arrangement to that described in another application filed by me, and these parts therefore need not be described further than is necessary to show the connection of my improvements herein described therewith.

In the accompanying drawings, A represents the rake-stand; B, a vertical shaft mounted and rotating in bearings therein, and provided on its upper end with a socketed head, B', for the reception of the bell-cranks or elbows $b$, pivoted therein, and to which the rake-arms and the friction-rollers traveling in and over the rake-cam C C' are attached. The head B' is shown adapted to receive five rake-arms; but more or less may be employed, if desired. The outer wall, C', of the grooved portion of the cam-track is provided with a switch or gate, $C^2$, having an angular heel-extension, said switch controlling the path of the rake and reel arms, the roller following the groove or inner side of the outer wall, C', when said arms are to act as rake-arms, and passing out through said wall to the outer side of said wall when said arms act as beaters or gathering-arms only. This cam-switch is held locked in position for causing the rake-rollers to pass out of the groove through the opening in the outer wall, C', by a weighted latch, $d$, and is retracted to close said opening when the latch is released by a spring, D, the arrangement of said parts being similar to that described in another application referred to.

E is a tripping-lever for releasing the latch $d$, connected by a horizontal pivot, $f$, with the upright arms of a swinging frame or yoke, G, mounted and swinging on a horizontal pin or shaft, $h$, secured in suitable bearing-lugs, $a\ a'$, on the rake-stand A. The pivot $f$, on which the tripping-lever E is mounted, is shown formed on the rear end of a rod, F, connected at its forward end with a crank-arm on a rock-shaft, F', which, through a crank-arm at its outer end and a rod connecting it with a treadle or foot-lever within convenient reach of the attendant in his seat on the machine, is placed under the control of the attendant, as hereinafter explained.

Just underneath the revolving rake-head B' is an adjustable tripping-gear plate, I, provided with a perforation for the rake-shaft passing through said plate, and upon or around which as a center said plate is adjustable. This plate is provided upon one side with a lip, I', overhanging the ledge $C^3$, on the inner side of the cam C, and in suitable lugs, $i\ i'$, upon its upper face is a sliding pin, J, provided between its supporting and guiding lugs with a spring, $j$, the tension of which is exerted to force the pin outward, causing it to engage with any one of a series of perforations or sockets, $c$ $c'$ $c^2$, for holding the plate at the desired adjustment. The pin J is provided on one side with a spur, $j'$, which enters a slot in a short upright arm, $k$, of an elbow or bell-crank lever, K, pivoted at its elbow in a pendent lug formed on the plate I. The outwardly-projecting arm of this lever K is provided with a weight, $k'$, which assists the spring $j$ in holding the pin J in the retaining-sockets in the rake-cam. By lifting the long or weighted arm of the lever K the pin J will be withdrawn from the socket $c$, $c'$, or $c^2$, when said lever serves as a handle for adjusting the plate I upon or around the rake-shaft. The rake-shaft is provided directly underneath the plate I with a spur-gear, M, keyed or otherwise secured to and rotating with it, and the plate I is provided at varying distances from said shaft with pendent stud-shafts $n$ $n'$ $n^2$, on which are mounted spur-gears $m$ $m'$ $m^2$, of different diameters, arranged around the central gear, M, and in mesh therewith. These gears are provided each with a pendent eccentrically-arranged pin, $p$, and any one of which, by the adjustment of the plate I around the rake-shaft, can be made once in each revolution of the gear with which it is connected to pass over the heel extension or arm E' of the tripping-lever E, depressing the same, and thereby raising the end underneath the latch $d$ for releasing the latter and the cam-switch. A bottom view of these tripping-gears is shown in Fig. 3, in which the actuating-gear M in the rake-shaft is shown provided with twenty-five teeth, and the gears $m$, $m'$, and $m^2$ engaging therewith with twenty, fifteen, and ten teeth, respectively. The rake-head being provided with five arms, if the gears are so adjusted that the gear $m$ is set to act upon the lever E, for tripping the latch and cam-switch, said lever will be acted upon once for every four-fifths of a revolution of the rake-shaft and gear M, and every fourth arm will thus automatically be made to act as a rake-arm; if by the gear $m'$, then every third arm will act, and if by the gear $m^2$, then every other arm will act as a rake-arm. This arrangement will of course be varied to suit the number of rake-arms, and may be employed as supplemental to the arrangement for tripping the cam described in my other application referred to, if desired.

With any one of the gears set to trip the latch and cam-switch, the attendant, by pressing upon the foot-lever referred to, and which is similar in arrangement to that shown and described in Letters Patent granted to me January 3, 1882, can rock the pivoted yoke G downward, depressing the heel end E' of the tripping-lever beyond the reach of the crank-pins $p$, and so prevent the tripping of the latch and cam-switch. This is important in turning corners to prevent the discharge of a gavel in a position where it would be liable to be trampled upon by the team on the next round, in places where the grain is thin and light and it is desired to let enough accumulate on the platform to form a bundle, and in order to place the machine fully under the control of the driver. The tripping-lever, with its swiveling yoke, after being thus adjusted by the driver, when released, is retracted or thrown up into working relation to the tripping-spur $p$ by means of a spring, $f'$, surrounding the connecting-rod F, and interposed between the connecting-pin $f$ on its end and a perforated or slotted lug, Q, on the gear-standard.

Parts of the rake mechanism not hereinabove particularly described may be constructed and arranged in a manner similar to the construction and arrangement of the corresponding parts in the patent or the other application referred to.

Having now described my invention, what I claim as new is—

1. The combination, with the rake and reel shaft and a cam and cam-switch for controlling the path of the arms thereof, of a series of tripping-gears of different diameters, adjustable around and in mesh with an actuating-gear on said shaft, and a tripping-lever, arranged and operating substantially as described.

2. The gear-plate provided with gears of different diameters, adjustable around and in mesh with an actuating gear on the rake-shaft, and each provided with a tripping pin or spur, in combination with the tripping-lever for releasing the cam-switch latch, substantially as described.

3. The tripping-lever for releasing the cam-switch latch connected by a horizontal pivot with an upright horizontally-pivoted and vertically-swinging support, whereby said tripping-lever is adapted to swing down out of the path of the tripping-spurs actuating it, substantially as described.

4. The combination, with the cam-switch and its retaining-latch, of the tripping-lever for releasing said latch, the adjustable tripping-gears for automatically actuating said lever, the swinging yoke or support in which said lever is pivoted, and mechanism controlled by the attendant in his seat on the machine for removing said lever out of the path of its actuating devices, substantially as described.

5. The combination, with a combined reel and rake, of the adjustable tripping-gear plate with its retaining pin or latch and the lever for releasing said pin and adjusting the gear-plate, substantially as described.

In testimony whereof I have hereunto set my hand this 6th day of June, 1882.

WM. ANSON WOOD.

In presence of—
 MASON EVANS,
 LEN. KING.